No. 896,958. PATENTED AUG. 25, 1908.
W. V. TURNER.
HIGH PRESSURE BRAKE.
APPLICATION FILED DEC. 5, 1905.
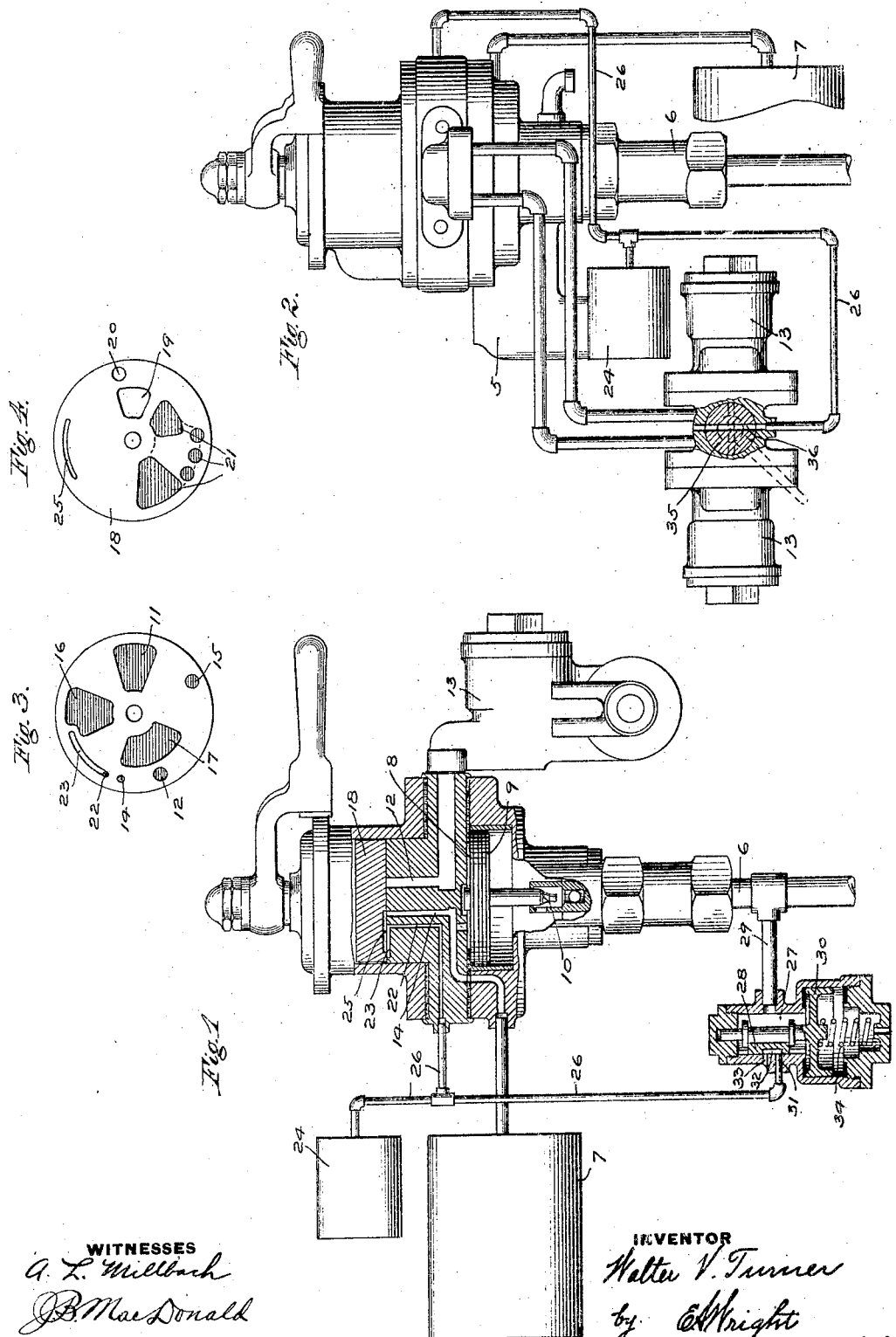
WITNESSES
INVENTOR
Walter V. Turner
by E. Wright
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

HIGH-PRESSURE BRAKE.

No. 896,958.  Specification of Letters Patent.  Patented Aug. 25, 1908.

Application filed December 5, 1905. Serial No. 290,425.

*To all whom it may concern:*

Be it known that I, WALTER V. TURNER, a citizen of the United States, residing in Wilkinsburg, in the county of Allegheny and State of Pennsylvania, have invented certain new and useful Improvements in High-Pressure Brakes, of which the following is a specification.

This invention relates to automatic fluid pressure brakes, and more particularly to what is known as high speed brake apparatus.

It is now the practice on passenger trains of many railroads to carry a high degree of pressure, from 100 to 110 pounds per square inch, in the train pipe and auxiliary reservoirs of the air brake system when running under normal conditions. In such a system carrying this high degree of pressure, when the train pipe pressure is gradually reduced sufficiently to produce a full service application of the brakes, that is, to equalize the pressures of the auxiliary reservoir and brake cylinder, the resulting brake cylinder pressure is considerably greater than is desired for service applications of the brakes and is liable to cause a sliding of the wheels. In order to overcome this objection it has been the practice to provide a high speed blow down valve for the brake cylinder, which valve is adapted to open when the brake cylinder pressure reaches a predetermined point, the desired limit in service applications, and discharge any excess of air pressure above this point to the atmosphere in service applications, but also adapted to permit the accumulation of the brake cylinder pressure to a much higher degree in emergency applications.

The principal object of my present invention is to prevent this excessive braking pressure in service applications; and it broadly comprises means for limiting the degree to which the train pipe pressure may be reduced in making service applications of the brakes, to an amount which is greater than the equalized pressure of the auxiliary reservoir and brake cylinder, and which amount of train pipe reduction produces a degree of brake cylinder pressure not greater than the maximum desired for service applications. Then after this predetermined amount of reduction has been made in train pipe pressure by the movement of the brake valve to service application position, no further reduction will take place even though the brake valve remain in or again be turned to this position, although a further reduction or a complete venting of the train pipe may be had at any time by turning the brake valve to emergency position in the usual way. In order that the standard high speed brake apparatus may also be used for operating at a lower or ordinary degree of pressure, it is customary to provide means whereby the system may be charged to either one of two pressures, such means comprising either a duplex pressure governor for the main reservoir and an excess pressure valve for the train pipe or a duplex governor and a duplex or double feed valve device with a cock for cutting in or out the low pressure device. When the system is operating at the low pressure, it is no longer necessary or desirable to limit the possible amount of train pipe reduction, and the maximum degree of brake cylinder pressure, since the full equalized pressure which may then be obtained is not considered so excessive as to produce wheel sliding in service applications.

Another feature of my invention, therefore, comprises means, operated either by hand, or by the train pipe pressure, or otherwise, for cutting out the limiting device and permitting a greater or the usual amount of reduction in train pipe pressure to be made in service applications when the system is adjusted to operate at the low pressure.

In the accompanying drawing, Figure 1 shows one form of my improvement applied to the Westinghouse standard air brake system, the engineer's brake valve and the automatic cut out valve being indicated in section; Fig. 2 a similar view showing a modified form of cut out valve for the limiting device; Fig. 3 a plan view of the valve seat of the engineer's brake valve; and Fig. 4 a face view of the rotary valve of the engineer's brake valve.

According to the construction shown, the engineer's brake valve may be of the usual standard Westinghouse design having main reservoir connection 5, train brake pipe connection 6, equalizing reservoir 7 communicating with chamber 8 above the equalizing piston 9, which operates the train pipe discharge valve 10, the brake valve seat having train pipe port 11, feed port 12 leading to feed valve 13, preliminary discharge port 14 communicating with the equalizing reservoir, equalizing port 15, exhaust port 16, and large cavity 17, while the rotary valve 18 is provided with through port 19, feed port 20 and large cavity 21, the construction and operation of all of which is well understood in the art.

In nearly all forms of engineer's brake valves used for controlling automatic air brakes on long trains, a movable abutment subject to opposing fluid pressures is employed for effecting a gradual closing of the train pipe discharge port in service applications of the brakes, and my improvement is especially adapted to be used in connection with engineer's brake valves of this type.

As applied to the Westinghouse brake valve, an additional port 22 having a groove 23 is located in the rotary valve seat and communicates with pipe 26 leading to a limiting or expansion reservoir 24, the capacity of which bears a certain desired relation to that of the equalizing reservoir 7, and a groove or cavity 25 is so formed in the face of the rotary valve 18 as to establish communication between ports 14 and 22 in service application position, and to open communication from the expansion reservoir and port 22 to the exhaust port 16 and the atmosphere in release and running positions.

In Fig. 1 I have shown an automatic valve device 27 operated by the train pipe pressure for cutting in or out the expansion reservoir by closing or opening communication between the pipe 26 and the atmosphere. Such a valve device may comprise a casing containing a piston 30 and slide valve 28 subject to train pipe pressure through pipe 29, and a spring 34 on the opposite side of the piston opposing the train pipe pressure.

When the system is operating at the low or ordinary pressure, the train pipe pressure acting on piston 30 is not sufficient to compress the spring 34 and the valve 28 remains in the position shown with the cavity 32 establishing communication from pipe 26 and port 31 to the atmosphere through exhaust port 33. Under these conditions, when the engineer's brake valve is turned to service application position, air from the equalizing reservoir and chamber 8 is discharged to the atmosphere through ports 14, 25, 22 and pipe 26, so that the brakes may then be applied and controlled or released in the ordinary way, as will be readily understood.

When the system is operated at high pressure, as in the standard high speed brake, the train pipe pressure acting on piston 30 is sufficiently great to compress the spring 34 and move the piston and valve down to its opposite seat, and close the outlet port 33 from pipe 26 to the atmosphere. Then when the engineer's brake valve is turned to service application position, the reduction from the equalizing reservoir is not made to the atmosphere but to the closed expansion chamber or reservoir 24, and as the air pressure above the equalizing piston 9 diminishes, the train pipe pressure beneath the piston raises the same and opens the train pipe discharge valve in the usual manner. When the desired reduction has been made in the equalizing reservoir, the brake valve is turned to lap position, in which all ports are closed, and the piston 9 operates to gradually close the train pipe discharge valve 10 after the train pipe pressure has reduced to substantially equal that of the equalizing reservoir in the usual way. Further graduations may be made in the same manner. If an excessive number of graduations be made, or if the brake valve should be left in service application position, it is plain that the pressure of the equalizing reservoir would merely expand into and equalize with that of the expansion reservoir, and that no further reduction of train pipe pressure could be made by the brake valve in this position. The capacity of the expansion reservoir 24 is therefore so determined with reference to the equalizing reservoir that the pressure resulting from equalizing these two reservoirs shall be such that, when the train pipe pressure is reduced from its normal high degree to this amount, the resulting brake cylinder pressure shall not exceed the desired maximum for service applications; for example, if the normal high degree of pressure carried in the equalizing reservoir, train pipe, and auxiliary reservoirs is 110 lbs. per square inch, the expansion reservoir may be of such size or capacity with respect to the equalizing reservoir that the equalized pressure will be about 90 pounds. In service applications, therefore, the train pipe pressure can only be reduced by the train pipe discharge valve to 90 pounds, which will produce a brake cylinder pressure of only about 60 to 65 pounds, which is much less than the full equalized pressure which may be obtained in emergency applications. In this manner the brake cylinder pressure may be limited to the desired maximum for service applications without the use of a blow off valve and the wasting of the air. When the brake valve is returned to release position the air from the expansion reservoir is exhausted to the atmosphere through ports 22, 23, 25 and 16, in order to be in readiness for the next service application.

My improvement does not in any way affect the emergency application which may be secured at any time in the usual manner, either automatically or by turning the brake valve to emergency position.

The feed valve device 13 may either be attached directly to the brake valve body, as indicated in Fig. 1, or may be double and attached by means of bracket, pipes, and cut out cock in the well known manner, as indicated in Fig. 2.

In lieu of the automatic cut out valve illustrated in Fig 1, a hand operated cock may be employed for controlling the outlet from pipe 26, and this cock may conveniently be combined with the feed valve cut out cock of a two pressure system, as shown in Fig. 2, in which the feed valve cock 35 is provided with an additional port 36, which is adapted to open the outlet from pipe 26 to the atmosphere when set for cutting in the low pressure feed valve, and to close said pipe when the low pressure feed valve is cut out and the system operating at high pressure.

Where the apparatus is adapted to be operated at either one of two pressures, any other suitable or preferred form of device may be used for cutting out the limiting mechanism when working at the low pressure, but in case the system is designed to operate at high pressure only, of course no cut out device is necessary.

Another advantage derived from my invention is that it saves a large amount of compressed air, which is often wasted by making excessive train pipe reductions in service applications, and thereby makes it possible to always effect a prompt release of the brakes after a full service application without the delay necessary to restore such a large amount of air to the train pipe.

While I have described one form of my improvement as applied to the standard Westinghouse air brake system, it is obvious that other forms may be devised and applied to other types of brakes, and that my invention is not limited to any particular system, but covers broadly any means used in connection with an automatic air brake system operating at high pressure for limiting the amount of reduction in train pipe pressure which may be made in service applications to such a degree that the brake cylinder pressure shall not exceed the maximum desired in service applications of the brakes.

Having now described my invention, what I claim as new and desire to secure by Letters Patent is:—

1. In an automatic high pressure brake apparatus, the combination with a train pipe, and engineer's brake valve, of means for limiting the maximum amount of train pipe reduction in service applications to such a degree as will produce the desired maximum braking effect.

2. In an automatic high pressure brake apparatus, the combination with a train pipe, and engineer's brake valve, of means for limiting the maximum amount of train pipe reduction which may be made in service applications to a predetermined degree of pressure which is considerably greater than the full equalized braking pressure.

3. In a high pressure brake apparatus, the combination with a train pipe and an engineer's brake valve having a movable abutment subject to fluid pressure for closing the train pipe discharge port in service applications, of means for limiting the minimum degree to which the pressure upon one side of said abutment may be reduced in service application to an amount greater than that necessary to produce full equalized braking pressure.

4. In a high pressure brake apparatus, the combination with a train pipe and an engineer's brake valve having a movable abutment subject to the opposing pressures of the train pipe and a reservoir for gradually closing the train pipe discharge port in service applications, of means for limiting the maximum amount of variation which may be made in said reservoir pressure in full service position of the brake valve, whereby excessive braking pressure is prevented.

5. In a high pressure brake apparatus, the combination with a train pipe and an engineer's brake valve having a movable abutment subject to the opposing pressures of the train pipe and an equalizing reservoir for operating the train pipe discharge valve, of an expansion reservoir for limiting the minimum degree to which the equalizing reservoir pressure may be reduced in service applications to an amount greater than the full equalized braking pressure.

6. In a high pressure brake apparatus, the combination with a train pipe and an engineer's brake valve having a movable abutment subject to the opposing pressures of the train pipe and an equalizing reservoir for operating the train pipe discharge valve, of an expansion chamber and ports for opening communication from the equalizing reservoir to the expansion reservoir in a single service position, and from the expansion reservoir to the atmosphere in release and running positions.

7. In a high pressure brake apparatus, the combination with a train pipe and an engineer's brake valve, of mechanism for limiting the degree to which the train pipe may be reduced in making service application, and a device for cutting out the limiting mechanism.

8. In a high pressure brake apparatus, the combination with a train pipe and an engineer's brake valve, of mechanism for limiting the degree to which the train pipe may be reduced in making service application, and a device for cutting out the limiting mechanism when the brake system is set to operate at a low or ordinary degree of pressure.

9. In a high pressure brake apparatus, the combination with a train pipe and engineer's brake valve, of means for limiting the amount of reduction which may be made in train pipe pressure in service applications, and a valve device operated by the pressure in the system for automatically cutting out the limiting means when the system is charged to a low degree of pressure.

10. In a high pressure brake apparatus, the combination with a train pipe, and engineer's brake valve having a movable abutment subject to the opposing pressures of the train pipe and an equalizing reservoir for operating a train pipe discharge valve in service applications, of an expansion chamber for receiving the preliminary discharge from the equalizing reservoir, and a valve device for opening or closing an exhaust outlet from the preliminary discharge port.

In testimony whereof I have hereunto set my hand.

WALTER V. TURNER.

Witnesses:
R. F. EMERY,
J. B. MACDONALD.